United States Patent
Tabushi et al.

(10) Patent No.: US 9,051,994 B2
(45) Date of Patent: Jun. 9, 2015

(54) DUAL CLUTCH TRANSMISSION

(75) Inventors: Isao Tabushi, Wako (JP); Takahito Fujita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 106 days.

(21) Appl. No.: 13/805,204

(22) PCT Filed: May 18, 2011

(86) PCT No.: PCT/JP2011/061382
§ 371 (c)(1),
(2), (4) Date: Mar. 7, 2013

(87) PCT Pub. No.: WO2012/002056
PCT Pub. Date: Jan. 5, 2012

(65) Prior Publication Data
US 2013/0180351 A1    Jul. 18, 2013

(30) Foreign Application Priority Data

Jun. 29, 2010  (JP) .................................. 2010-147172

(51) Int. Cl.
*F16H 3/08* (2006.01)
*F02D 41/02* (2006.01)
(Continued)

(52) U.S. Cl.
CPC ............. *F16H 3/08* (2013.01); *Y10T 74/19228* (2015.01); *F02D 41/023* (2013.01);
(Continued)

(58) Field of Classification Search
CPC ............ F16H 3/006; F16H 2003/0931; F16H 61/688; F16H 3/093; F16H 61/32; F16H 61/30; F16H 1/04; F16H 63/50; F02D 29/00; F02D 41/04; F02P 5/15
USPC ............ 74/330, 331, 335; 477/101, 102, 107, 477/109, 110, 115, 15, 20, 111
See application file for complete search history.

(56) References Cited

U.S. PATENT DOCUMENTS 7,287,443 B2    10/2007  Kuhstrebe et al.
7,624,658 B2 *  12/2009  Fahland et al. ................. 74/331
(Continued)

FOREIGN PATENT DOCUMENTS

JP       200071816 A  *  3/2000
JP      2002-138873 A     5/2002
(Continued)

OTHER PUBLICATIONS

English Translation of JP-2005014797-A. Machine translation performed using Japan Patent Office "AIPN" website. URL: "http://dossier1.ipdl.inpit.go.jp/AIPN/odse_top_dn.ipdl?N0000=7400".*
(Continued)

*Primary Examiner* — William Kelleher
*Assistant Examiner* — Thomas Magnuson
(74) *Attorney, Agent, or Firm* — Squire Patton Boggs (US) LLP

(57) ABSTRACT

A dual clutch transmission is provided in which at a time of pre-shifting when, while one of first and second driving force transmission paths extending from first and second input shafts to an output shaft is transmitting the driving force, the selection device for the other driving force transmission path is operated, the driving force of an internal combustion engine is changed by a command from an electronic control unit. Even if a driving force or braking force due to inertia occurs as a result of a change in the rotational speed of the first and second input shafts accompanying the pre-shifting, it is possible to reduce the shift shock by compensating for the driving force or braking force due to the inertia by changing the driving force of the engine.

6 Claims, 5 Drawing Sheets

(51) Int. Cl.
*F16H 61/688* (2006.01)
*F16H 63/50* (2006.01)
*F16H 61/04* (2006.01)

(52) U.S. Cl.
CPC ......... *F02D 2250/21* (2013.01); *F16H 61/688* (2013.01); *F16H 63/502* (2013.01); *F16H 2306/18* (2013.01); *F16H 2306/42* (2013.01); *F16H 61/0437* (2013.01)

(56) References Cited

U.S. PATENT DOCUMENTS

| | | | |
|---|---|---|---|
| 7,651,440 B2 | 1/2010 | Runde | |
| 7,713,164 B2 * | 5/2010 | Silveri et al. | 477/5 |
| 7,735,388 B2 * | 6/2010 | Sakamoto et al. | 74/339 |
| 7,740,558 B2 * | 6/2010 | Matsumura et al. | 477/79 |
| 8,038,574 B2 * | 10/2011 | Fujimoto et al. | 477/130 |
| 2009/0233757 A1 * | 9/2009 | Soliman et al. | 477/3 |
| 2010/0119378 A1 * | 5/2010 | Shibamoto et al. | 417/44.1 |
| 2010/0244461 A1 * | 9/2010 | Delf | 290/40 F |

FOREIGN PATENT DOCUMENTS

| | | | | |
|---|---|---|---|---|
| JP | 2004251174 A | * | 9/2004 | |
| JP | 2005-14797 A | | 1/2005 | |
| JP | 2005014797 A | * | 1/2005 | |
| JP | 4229994 B2 | | 12/2008 | |
| JP | 2009-162357 A | | 7/2009 | |
| JP | 2009162357 A | * | 7/2009 | |
| JP | 2010-078123 A | | 4/2010 | |

OTHER PUBLICATIONS

English Translation of JP-2009162357-A. Machine translation performed using Japan Patent Office "AIPN" website. URL: "http://dossier1.ipdl.inpit.go.jp/AIPN/odse_top_dn.ipdl?N0000=7400".*
English Translation of Takane reference, generated by JPO site.*
English Translation of Hashimoto reference, generated by JPO site.*
Japanese Office Action dated Jan. 7, 2015, corresponding to Japanese Patent Application No. 2012-522508 (a national phase application in Japan from PCT/JP2011/061382).
Chinese Office Action dated Nov. 15, 2014, for corresponding Chinese Patent Appln. No. 201180029309.8.

* cited by examiner

DUAL CLUTCH TRANSMISSION

CROSS-REFERENCED TO RELATED APPLICATION

This application is a National Stage entry of International Application PCT/JP2011/061382, filed May 18, 2011, which claims priority to Japanese Patent Application No. 2010-147172, filed Jun. 29, 2010, the disclosure of the prior applications are hereby incorporated in their entirety by reference.

TECHNICAL FIELD

The present invention relates to a dual clutch transmission that transmits the driving force of a drive source to a driven wheel via a first driving force transmission path that passes through a first clutch, a first input shaft, a first gear train, and an output shaft and a second driving force transmission path that passes through a second clutch, a second input shaft, a second gear train, and the output shaft.

BACKGROUND ART

An arrangement of such a dual clutch transmission in which a freely engageable friction wheel mechanism is disposed between first and second input shafts and an output shaft, when for example a shift down is carried out the first input shaft or the second input shaft is connected to the output shaft via the friction wheel mechanism, the rotational speed of the first input shaft or the second input shaft is accelerated up to a predetermined rotational speed, and a synchronizing device is thus smoothly operated so as to reduce shift shock when shifting gears is known from Patent Document 1 below.

RELATED ART DOCUMENTS

Patent Documents

Patent Document 1: Japanese Patent No. 4229994

SUMMARY OF THE INVENTION

Problems to be Solved by the Invention

Since the above-mentioned conventional arrangement requires a special friction wheel mechanism to be provided in order to reduce shift shock, the number of components increases by an amount corresponding to the friction wheel mechanism, thus giving rise to the problems of an increase in cost and the dimensions of the transmission increasing.

The present invention has been accomplished in light of the above-mentioned circumstances, and it is an object thereof to reduce shift shock when pre-shifting in a dual clutch transmission while not causing any increase in the number of components.

Means for Solving the Problems

In order to attain the above object, according to a first aspect of the present invention, there is provided a dual clutch transmission comprising a first input shaft to which a driving force from a drive source is transmitted via a first clutch, a second input shaft to which a driving force from the drive source is transmitted via a second clutch, an output shaft connected to a driven wheel, first selection means that selects a first gear train that can provide a connection between the first input shaft and the output shaft, second selection means that selects a second gear train that can provide a connection between the second input shaft and the output shaft, a first driving force transmission path that, when the first clutch is engaged, shifts the gear of the driving force of the first input shaft and transmits the driving force to the output shaft via the first gear train selected by the first selection means, and a second driving force transmission path that, when the second clutch is engaged, shifts the gear of the driving force of the second input shaft and transmits the driving force to the output shaft via the second gear train selected by the second selection means, characterized in that the transmission comprises driving force regulation means that suppresses variation of the driving force transmitted to the driven wheel by changing the driving force of the drive source at a time of pre-shifting when, while running, among the first driving force transmission path and the second driving force transmission path, via one driving force transmission path that is transmitting the driving force, the selection means for the other driving force transmission path that is not transmitting the driving force is operated.

Further, according to a second aspect of the present invention, in addition to the first aspect, the driving force regulation means reduces the torque of the drive source when the first selection means or the second selection means carries out a pre-shift to a higher speed gear position than the current gear position and increases the torque of the drive source when the first selection means or the second selection means carries out a pre-shift to a lower speed gear position than the current gear position.

Furthermore, according to a third aspect of the present invention, in addition to the second aspect, the drive source is an internal combustion engine, and reduction of the torque is carried out by retardation of the ignition timing of the internal combustion engine or decrease of the amount of fuel injected of the internal combustion engine.

Moreover, according to a fourth aspect of the present invention, in addition to the second aspect, the drive source is an internal combustion engine, and increase of the torque is carried out by increase of the intake air amount and retardation of the ignition timing of the internal combustion engine in combination or by increase of the amount of fuel injected of the internal combustion engine.

Further, according to a fifth aspect of the present invention, in addition to the second aspect, the drive source is an electric motor, and reduction of the torque is carried out by decrease of the drive current for the electric motor.

Furthermore, according to a sixth aspect of the present invention, in addition to the second aspect, the drive source is an electric motor, and increase of the torque is carried out by increase of the drive current for the electric motor.

A first speed drive gear 18 and a third speed drive gear 19 of an embodiment correspond to the first gear train of the present invention, a second speed drive gear 22 and a fourth speed drive gear 23 of the embodiment correspond to the second gear train of the present invention, a first speed-second speed driven gear 20 and a third speed-fourth speed driven gear 21 of the embodiment correspond to the first gear train and the second gear train of the present invention, an internal combustion engine E and an electric motor M of the embodiment correspond to the drive source of the present invention, a first synchronizing device S1 of the embodiment corresponds to the first selection means of the present invention, a second synchronizing device S2 of the embodiment corresponds to the second selection means of the present invention, and an electronic control unit U of the embodiment corresponds to the driving force regulation means of the present invention.

Effects of the Invention

In accordance with the first aspect of the present invention, when the first clutch is engaged in a state in which the first gear train is selected by the first selection means, the first driving force transmission path for transmitting the driving force of the drive source to the driven wheel via the first input shaft, the first gear train, and the output shaft is established, and when the second clutch is engaged in a state in which the second gear train is selected by the second selection means, the second driving force transmission path for transmitting the driving force of the drive source to the driven wheel via the second input shaft, the second gear train, and the output shaft is established. Since at a time of pre-shifting when, while running, among the first and second driving force transmission paths, via one driving force transmission path that is transmitting the driving force, the selection means for the other driving force transmission path that is not transmitting the driving force is operated, the driving force of the drive source is changed by the driving force regulation means to thus suppress variation of the driving force that is transmitted to the driven wheel, even if a driving force or braking force due to inertia occurs as a result of a change in the rotational speed of the first and second input shafts accompanying the pre-shifting, it is possible to reduce the shift shock by compensating for the driving force or braking force due to the inertia by changing the driving force of the drive source. Moreover, since the shift shock can be reduced just by changing the driving force of the drive source without adding a special structure to the transmission, it is possible to prevent the cost and the dimensions of the transmission from increasing.

Furthermore, in accordance with the second aspect of the present invention, the driving force regulation means carries out torque reduction for the driving force of the drive source when the first selection means or the second selection means pre-shifts to a gear position on a higher speed side than the current gear position, thus enabling the shift shock when shifting up to be reduced, and carries out torque increase for the driving force of the drive source when the first selection means or the second selection means pre-shifts to a gear position on a lower speed side than the current gear position, thus enabling the shift shock when shifting down to be reduced.

Moreover, in accordance with the third aspect of the present invention, when the drive source is an internal combustion engine, the torque reduction can be carried out with good precision by retarding the ignition timing of the internal combustion engine or reducing the amount of fuel injection of the internal combustion engine.

Furthermore, in accordance with the fourth aspect of the present invention, when the drive source is an internal combustion engine, the torque increase can be carried out with good precision by employing in combination increasing the amount of air intake and retarding the ignition timing of the internal combustion engine or increasing the amount of fuel injection of the internal combustion engine.

Moreover, in accordance with the fifth aspect of the present invention, when the drive source is an electric motor, the torque reduction can be carried out with good precision by reducing the drive current for the electric motor.

Furthermore, in accordance with the sixth aspect of the present invention, when the drive source is an electric motor, the torque increase can be carried out with good precision by increasing the drive current for the electric motor.

MODES FOR CARRYING OUT THE INVENTION

A mode for carrying out the present invention is explained below by reference to FIG. 1 to FIG. 5.

First Embodiment

Figure 1:
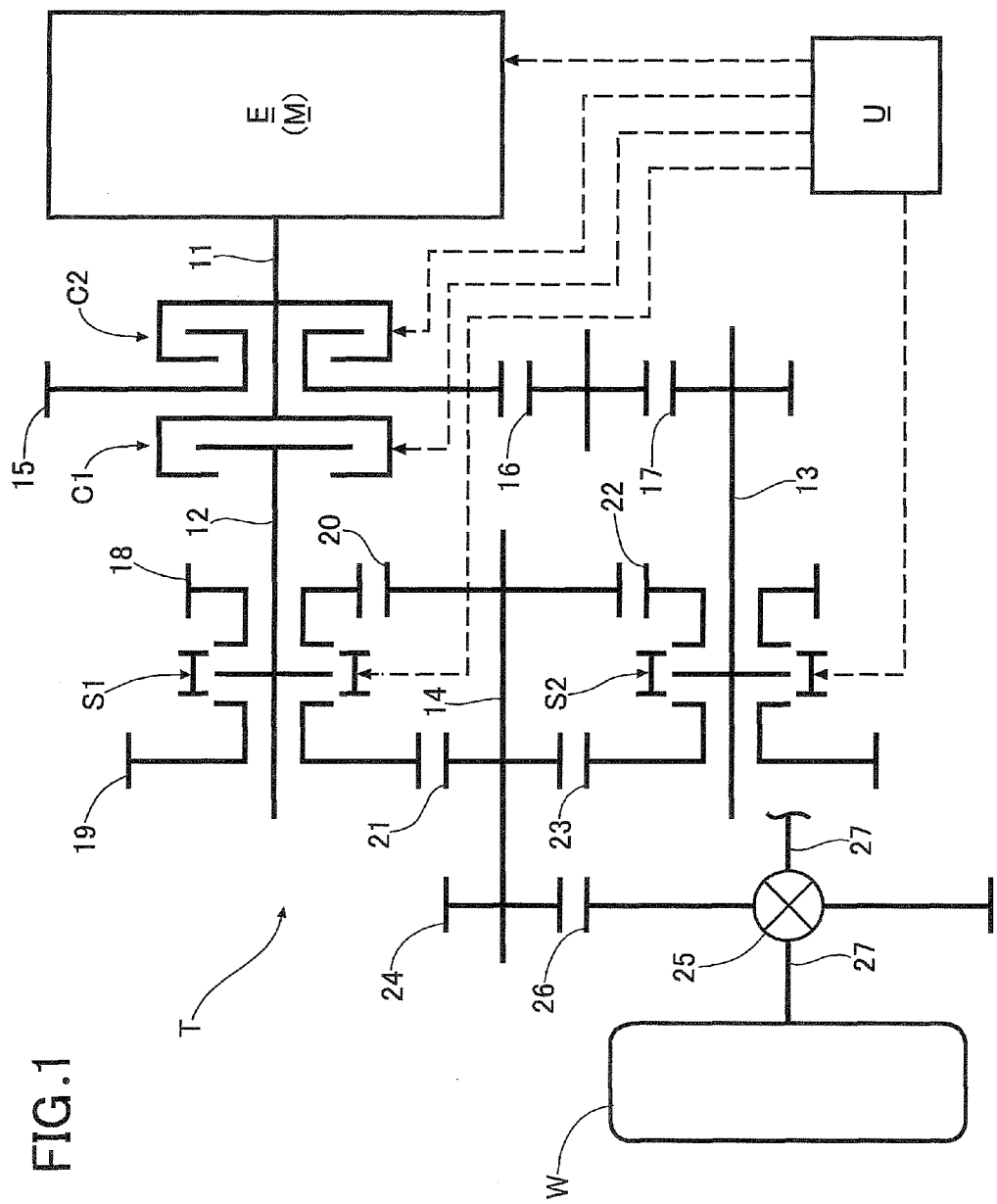
FIG. 1 is a skeleton diagram of a dual clutch transmission. (first embodiment)

As shown in FIG. 1, a vehicle-installed dual clutch transmission T includes a first input shaft 12 coaxially disposed with a crankshaft 11 of an internal combustion engine E, which is a gasoline engine, a second input shaft 13 disposed in parallel with the first input shaft 12, and an output shaft 14 disposed in parallel with the first input shaft 12 and the second input shaft 13. The driving force of the crankshaft 11 is transmitted to the first input shaft 12 via a first clutch C1 and is also transmitted to the second input shaft 13 via a second clutch C2, a drive gear 15, an intermediate gear 16, and a driven gear 17.

A first speed drive gear 18 and a third speed drive gear 19 are relatively rotatably supported on the first input shaft 12, and the first speed drive gear 18 and the third speed drive gear 19 respectively mesh with a first speed-second speed driven gear 20 and a third speed-fourth speed driven gear 21 fixedly provided on the output shaft 14. Furthermore, a second speed drive gear 22 and fourth speed drive gear 23 are relatively rotatably supported on the second input shaft 13, and the second speed drive gear 22 and the fourth speed drive gear 23 respectively mesh with the first speed-second speed driven gear 20 and the third speed-fourth speed driven gear 21 fixedly provided on the output shaft 14.

A first speed-third speed synchronizing device S1 is provided on the first input shaft 12 so that the first speed drive gear 18 and the third speed drive gear 19 are interposed therebetween, and the first speed drive gear 18 or the third speed drive gear 19 can be selectively connected to the first input shaft 12 by means of the first speed-third speed synchronizing device S1. Furthermore, a second speed-fourth speed synchronizing device S2 is provided on the second input shaft 13 so that the second speed drive gear 22 and the fourth speed drive gear 23 are interposed therebetween, and the second speed drive gear 22 or the fourth speed drive gear 23 can be selectively connected to the second input shaft 13 by means of the second speed-fourth speed synchronizing device S2.

A final drive gear 24 fixedly provided on the output shaft 14 meshes with a final driven gear 26 fixedly provided on a case of a differential gear 25, and left and right driven wheels W and W (only one thereof being illustrated) are connected to drive shafts 27 and 27 extending laterally from the differential gear 25.

A driving force transmission path extending from the first input shaft 12 to the output shaft 14 via the first speed-third speed synchronizing device S1, the first speed drive gear 18, and the first speed-second speed driven gear 20 and a driving force transmission path extending from the first input shaft 12 to the output shaft 14 via the first speed-third speed synchronizing device S1, the third speed drive gear 19, and the third speed-fourth speed driven gear 21 form a first driving force transmission path of the present invention. Furthermore, a driving force transmission path extending from the second input shaft 13 to the output shaft 14 via the second speed-fourth speed synchronizing device S2, the second speed drive gear 22, and the first speed-second speed driven gear 20 and a driving force transmission path extending from the second input shaft 13 to the output shaft 14 via the second speed-fourth speed synchronizing device S2, the fourth speed drive gear 23, and the third speed-fourth speed driven gear 21 form a second driving force transmission path of the present invention.

An electronic control unit U into which a vehicle state such as a shift position, a vehicle speed, or a degree of accelerator opening is inputted, controls the operation of the first and second clutches C1 and C2 and the first and second synchronizing devices S1 and S2 of the dual clutch transmission T and the output torque of the internal combustion engine E.

The operation of the embodiment of the present invention having the above-mentioned arrangement is now explained.

When the first clutch C1 is engaged in a state in which the first synchronizing device S1 is moved rightward to couple the first speed drive gear 18 to the first input shaft 12, the driving force of the crankshaft 11 of the internal combustion engine E is transmitted to the left and right driven wheels W and W via the path: first clutch C1→first input shaft 12→first synchronizing device S1→first speed drive gear 18→first speed-second speed driven gear 20→output shaft 14→final drive gear 24→final driven gear 26→differential gear 25→drive shafts 27 and 27, thus establishing a first speed gear position.

When the second clutch C2 is engaged in a state in which the second synchronizing device S2 is moved rightward to couple the second speed drive gear 22 to the second input shaft 13, the driving force of the crankshaft 11 of the internal combustion engine E is transmitted to the left and right driven wheels W and W via the path: second clutch C2→drive gear 15→intermediate gear 16→driven gear 17→second input shaft 13→second synchronizing device S2→second speed drive gear 22→first speed-second speed driven gear 20→output shaft 14→final drive gear 24→final driven gear 26→differential gear 25→drive shafts 27 and 27, thus establishing a second speed gear position.

When the first clutch C1 is engaged in a state in which the first synchronizing device S1 is moved leftward to couple the third speed drive gear 19 to the first input shaft 12, the driving force of the crankshaft 11 of the internal combustion engine E is transmitted to the left and right driven wheels W and W via the path: first clutch C1→first input shaft 12→first synchronizing device S1→third speed drive gear 19→third speed-fourth speed driven gear 21→output shaft 14→final drive gear 24→final driven gear 26→differential gear 25→drive shafts 27 and 27, thus establishing a third speed gear position.

When the second clutch C2 is engaged in a state in which the second synchronizing device S2 is moved leftward to couple the fourth speed drive gear 23 to the second input shaft 13, the driving force of the crankshaft 11 of the internal combustion engine E is transmitted to the left and right driven wheels W and W via the path: second clutch C2→drive gear 15→intermediate gear 16→driven gear 17→second input shaft 13→second synchronizing device S2→fourth speed drive gear 23→third speed-fourth speed driven gear 21→output shaft 14→final drive gear 24→final driven gear 26→differential gear 25→drive shafts 27 and 27, thus establishing a fourth speed gear position.

In the dual clutch transmission T, when running with the first clutch C1 engaged and an odd-number gear position (first speed or third speed) established by means of the first synchronizing device S1, pre-shifting to an even-number gear position (second speed or fourth speed) is carried out by means of the second synchronizing device S2, the engagement of the first clutch C1 is released, and the second clutch C2 is engaged, thereby enabling a shift change from an odd-number gear position to an even-number gear position to be carried out quickly.

In the same manner, when running with the second clutch C2 engaged and an even-number gear position (second speed or fourth speed) established by means of the second synchronizing device S2, pre-shifting to an odd-number gear position (first speed or third speed) is carried out by means of the first synchronizing device S1, the engagement of the second clutch C2 is released, and the first clutch C1 is engaged, thereby enabling a shift change from an even-number gear position to an odd-number gear position to be carried out quickly.

Figure 2:
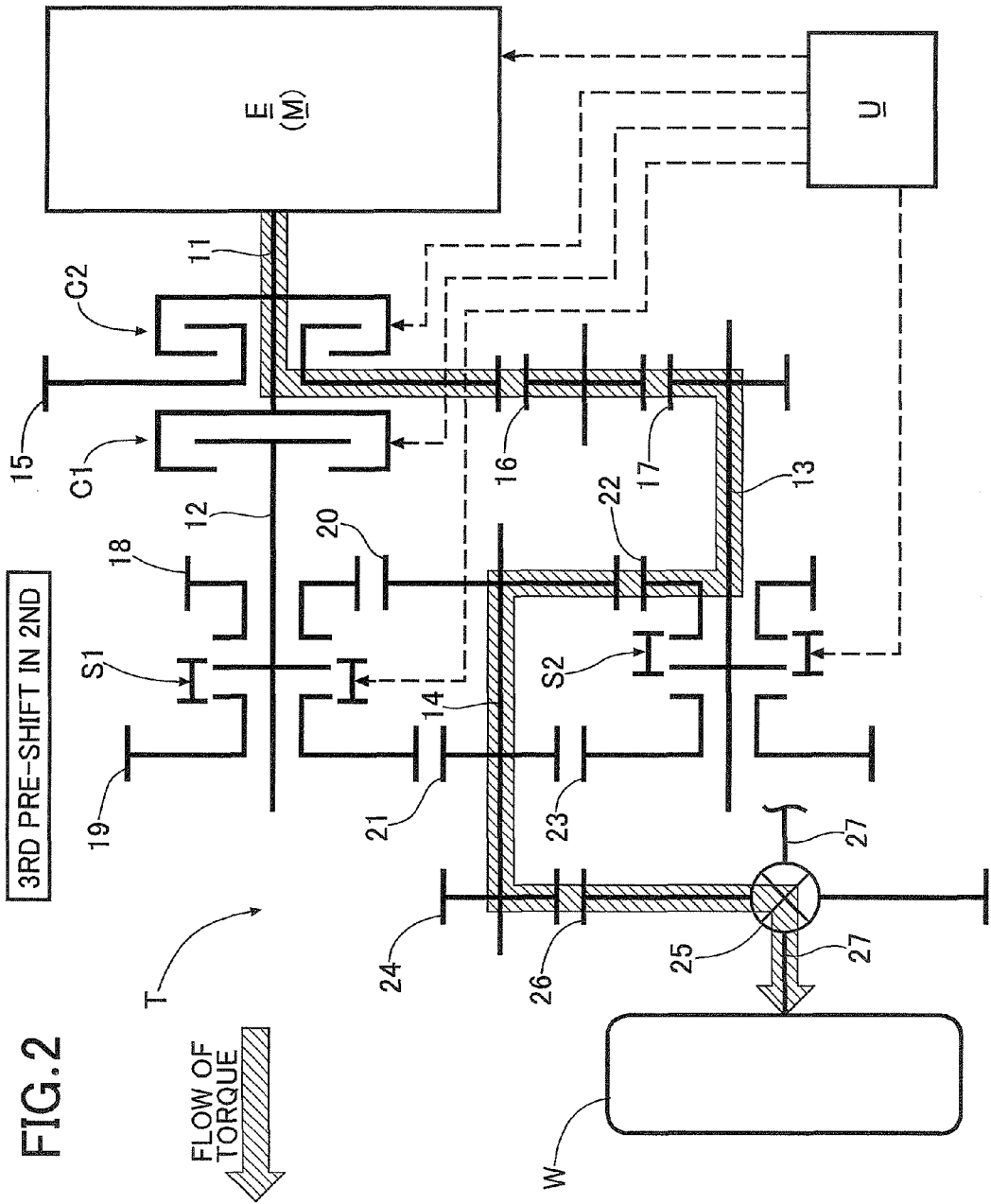
FIG. 2 is a diagram showing the transmission in a first speed pre-shift state at a second speed gear position. (first embodiment)

FIG. 2 shows a state in which the second clutch C2 is engaged and the second synchronizing device S2 has moved rightward to thus establish the second speed gear position, and since the vehicle is in an accelerating state at this time, pre-shifting from the first speed gear position to the third speed gear position is carried out by means of the first synchronizing device S1 while running in the second speed gear position.

In the state before this third speed pre-shift, since the engagement of the first clutch C1 is released, the first input shaft 12 is detached from the crankshaft 11, but rotation of the output shaft 14 is being transmitted to the first input shaft 12 via the path: first speed-second speed driven gear 20→first speed drive gear 18→first synchronizing device S1, and the first input shaft 12 is rotating. When the first synchronizing device S1 moves leftward from this state to thus carry out a pre-shift to the third speed gear position, rotation of the output shaft 14 is transmitted to the first input shaft 12 via the path: third speed-fourth speed driven gear 21→third speed drive gear 19→first synchronizing device S1, and the first input shaft 12 is decelerated by virtue of the difference in gear ratio between the first speed gear position and the third speed gear position.

In this way, when the rotational speed of the first input shaft 12, which is driven by the output shaft 14, is decelerated due to the third speed pre-shift, since the output shaft 14 is driven by the inertia of the first input shaft 12, there is a possibility that shift shock in a direction that accelerates the vehicle will occur and the driver will experience an unpleasant sensation.

Figure 4:
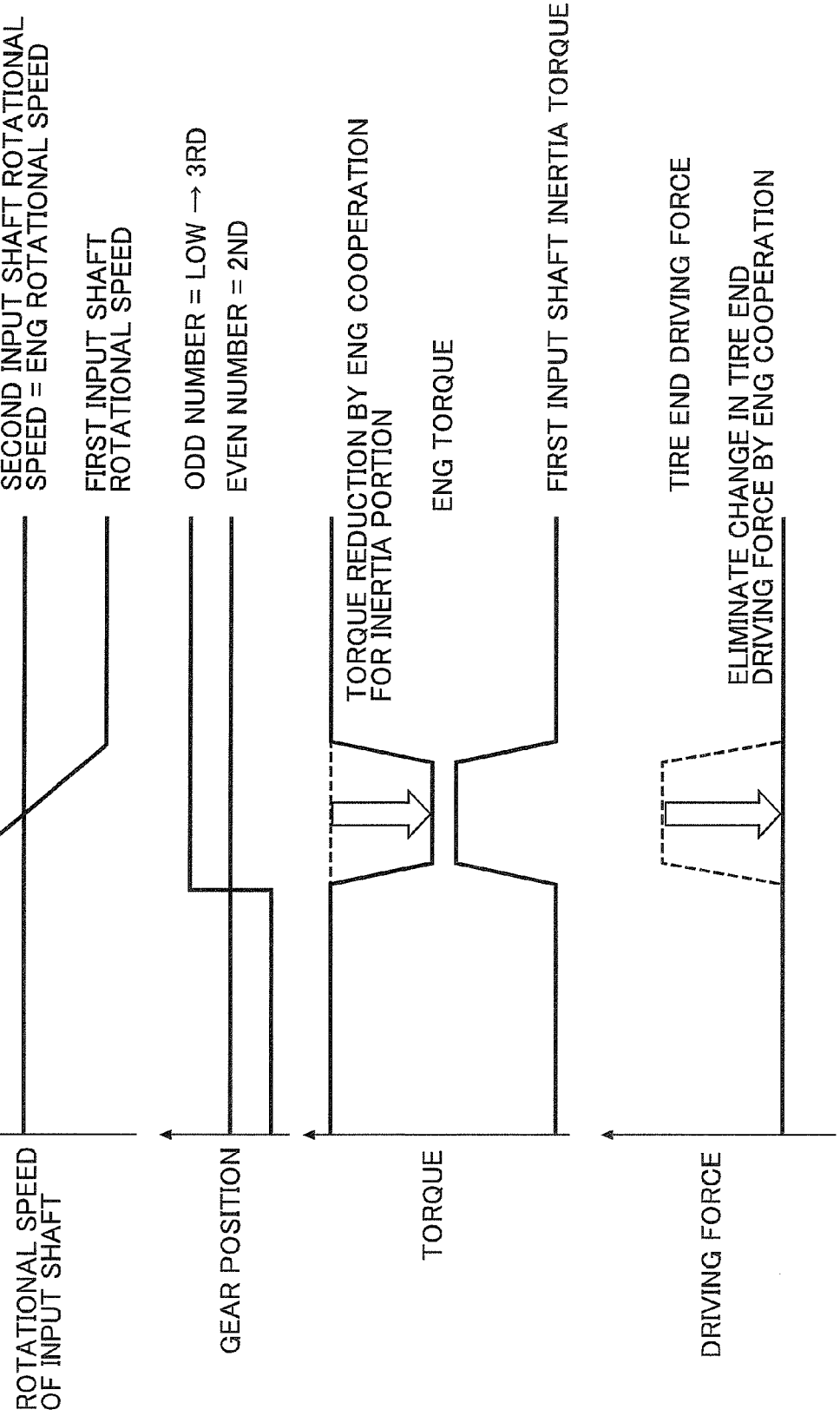
FIG. 4 is a time chart for explaining the operation when shifting up. (first embodiment)

In the present embodiment, as shown in the time chart of FIG. 4, when the first synchronizing device S1 moves leftward for the third speed pre-shift to thus detach the first speed drive gear 18 from the first input shaft 12 and couple the third speed drive gear 19 to the first input shaft 12, temporarily reducing the torque of the internal combustion engine E counterbalances the shift shock in a direction that accelerates the vehicle and suppresses variation of the driving force transmitted to the driven wheels W and W, thereby preventing the occurrence of shift shock.

Reduction of the torque of the internal combustion engine E can be carried out by retardation of the ignition timing, and the control responsiveness thereof can be fully ensured.

In a vehicle employing an electric motor M (see FIG. 1) instead of the internal combustion engine E, temporarily reducing the drive current for the electric motor M enables torque reduction to be carried out with good responsiveness.

Figure 3:
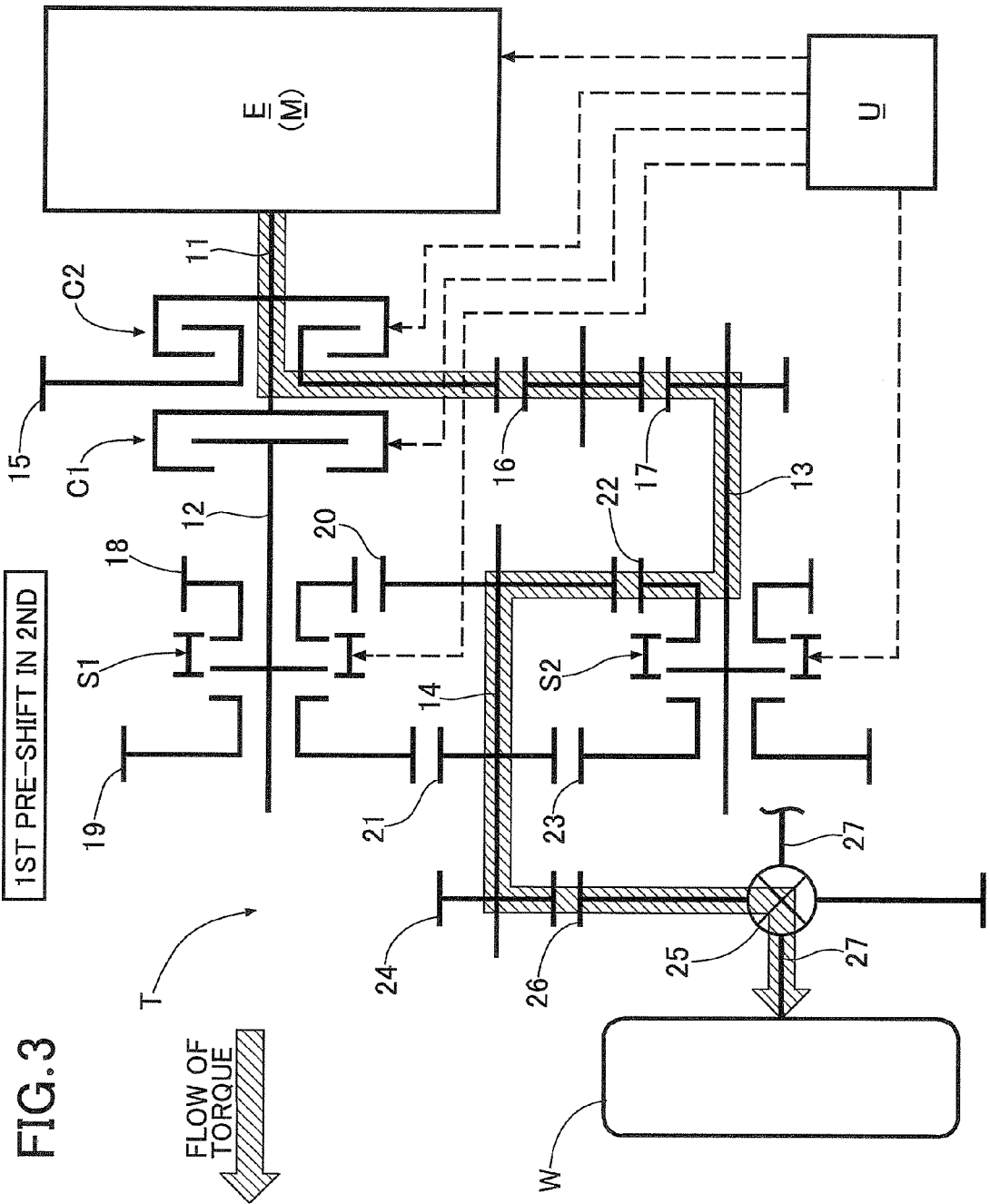
FIG. 3 is a diagram showing the transmission in a third speed pre-shift state at a second speed gear position. (first embodiment)

FIG. 3 shows a state in which the second clutch C2 is engaged and the second synchronizing device S2 has moved rightward to thus establish the second speed gear position, and since the vehicle is in a decelerating state at this time, pre-shifting from the third speed gear position to the first speed gear position is carried out by means of the first synchronizing device S1 while running at the second speed gear position.

In the state before this first speed pre-shift, since the engagement of the first clutch C1 is released, the first input shaft 12 is detached from the crankshaft 11, but rotation of the output shaft 14 is being transmitted to the first input shaft 12 via the path: third speed-fourth speed driven gear 21→third speed drive gear 19→first synchronizing device S1, and the first input shaft 12 is rotating. When the first synchronizing device S1 moves rightward from this state to thus carry out a pre-shift to the first speed gear position, rotation of the output shaft 14 is transmitted to the first input shaft 12 via the path: first speed-second speed driven gear 20→first speed drive gear 18→first synchronizing device S1, and the first input shaft 12 is accelerated by virtue of the difference in gear ratio between the third speed gear position and the first speed gear position.

In this way, when the rotational speed of the first input shaft 12, which is driven by the output shaft 14, is increased due to the first speed pre-shift, since the output shaft 14 is braked by means of the inertia of the first input shaft 12, there is a possibility that shift shock in a direction that decelerates the vehicle will occur and the driver will experience an unpleasant sensation.

Figure 5:
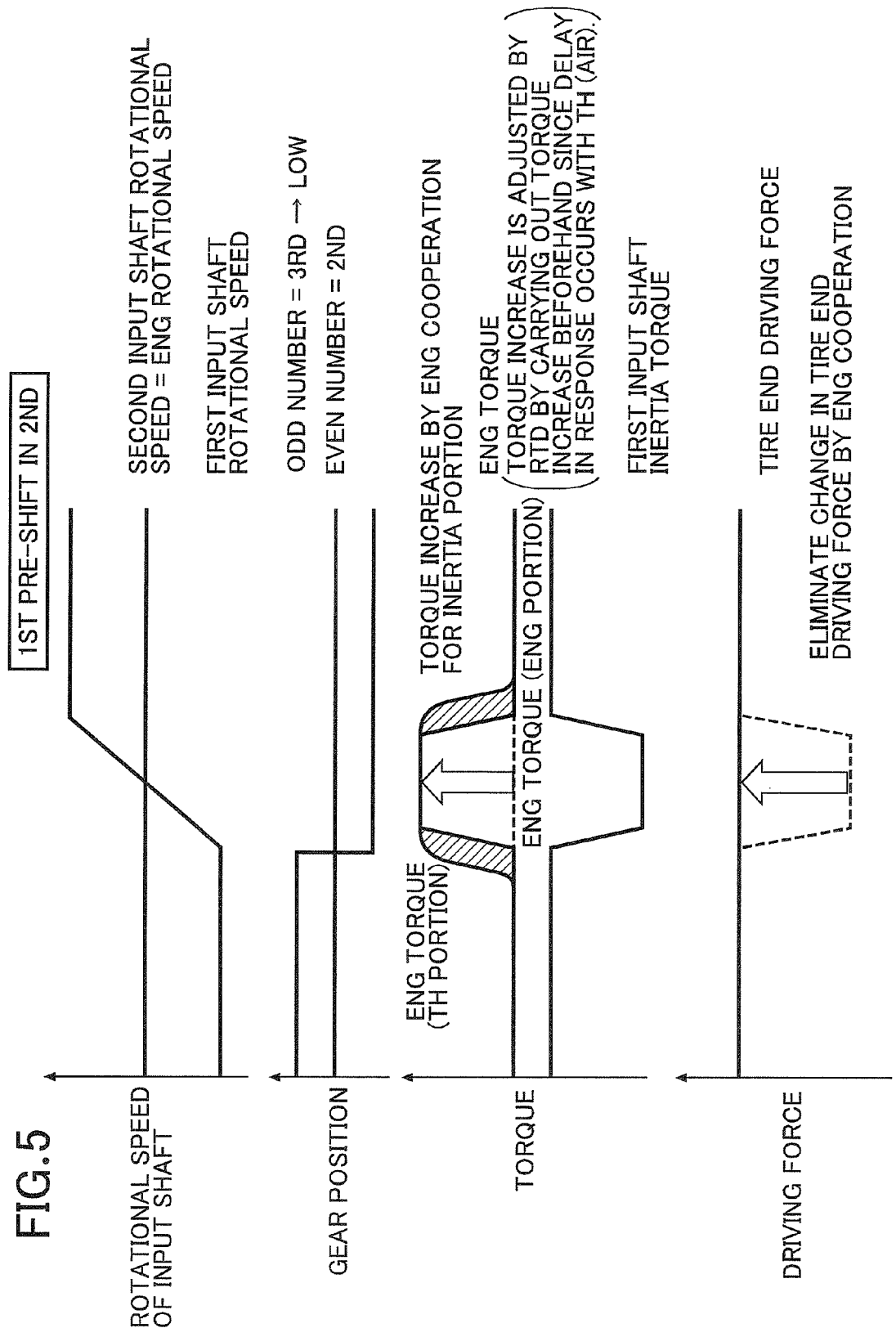
FIG. 5 is a time chart for explaining the operation when shifting down. (first embodiment)

In the present embodiment, as shown in the time chart of FIG. 5, when the first synchronizing device S1 moves rightward for the first speed pre-shift to thus detach the third speed drive gear 19 from the first input shaft 12 and couple the first speed drive gear 18 to the first input shaft 12, temporarily increasing the torque of the internal combustion engine E counterbalances the shift shock in a direction that decelerates the vehicle and suppresses variation of the driving force transmitted to the driven wheels W and W, thereby preventing the occurrence of shift shock.

Although increase of the torque of the internal combustion engine E is carried out by increasing the degree of throttle opening (intake air amount), since there is a time delay before the output torque of the internal combustion engine E changes after the degree of throttle opening changes, increasing the degree of throttle opening earlier than the timing of the first speed pre-shift and carrying out retardation of the ignition timing so as to match the timing of subsequent reduction of the degree of throttle openings enable the torque of the internal combustion engine E to be increased while maintaining high responsiveness and high control precision.

In a vehicle employing the electric motor M (see FIG. 1) instead of the internal combustion engine E, temporarily increasing the drive current for the electric motor M enables the torque to be increased with good responsiveness.

As described above, since, when carrying out a pre-shift to a higher speed gear position than the currently established gear position, the torque of the internal combustion engine E is reduced, and when carrying out a pre-shift to a lower speed gear position than the currently established gear position, the torque of the internal combustion engine E is increased, even if a driving force or a braking force occurs due to inertia as a result of changes in the rotational speed of the first and second input shafts 12 and 13 accompanying the pre-shift, it is possible to reduce the shift shock by compensating for the driving force or the braking force due to inertia by change in the driving force of the internal combustion engine E. Moreover, since the shift shock can be reduced just by changing the driving force of the internal combustion engine E without adding a special structure to the dual clutch transmission T, it is possible to prevent any increase in the cost and dimensions of the dual clutch transmission T.

An embodiment of the present invention is explained above, but the present invention may be modified in a variety of ways as long as the modifications do not depart from the spirit and scope thereof.

For example, when the internal combustion engine E is a gasoline engine, as explained by reference to FIG. 4 torque reduction may be carried out by retardation of the ignition timing, but when the internal combustion engine E is a diesel engine, torque reduction may be carried out by reduction of the amount of fuel injected.

Furthermore, when the internal combustion engine E is a gasoline engine, as explained by reference to FIG. 5 the torque can be increased by the use in combination of increase of the degree of throttle opening (intake air amount) and retardation of the ignition timing, but when the internal combustion engine E is a diesel engine or when it employs natural gas (CNG) as a fuel or methanol/ethanol or a mixture thereof with gasoline as a fuel, the torque can be increased by increase of the amount of fuel injected.

The invention claimed is:
1. A dual clutch transmission comprising:
a first input shaft to which a driving force from a drive source is transmitted via a first clutch,
a second input shaft to which a driving force from the drive source is transmitted via a second clutch,
an output shaft connected to a driven wheel,
a first selection device that is provided on the first input shaft side and is associated with two first gear trains, said first selection device selecting one of the two first gear trains that can alternatively provide a selective connection between the first input shaft and the output shaft,
a second selection device that is provided on the second input shaft side and with two second gear trains, said second selection device selecting one of the two second gear trains that can alternatively provide a selective connection between the second input shaft and the output shaft,
a first driving force transmission path that, when the first clutch is engaged, changes the driving force of the first input shaft and transmits the driving force to the output shaft via one of the first gear trains selected by the first selection device, and
a second driving force transmission path that, when the second clutch is engaged, changes the driving force of the second input shaft and transmits the driving force to the output shaft via one of the second gear trains selected by the second selection device,
wherein, at a speed gear position, one of the first and second driving force transmission paths is transmitting the driving force and the other driving force transmission paths is not transmitting the driving force, and one of the two gear trains for the other of the driving force transmission paths that is not transmitting the drive force is connected to the first or second input shaft via the first or second clutch and rotation of the output shaft is transmitted to the first or second input shaft while the other gear train for the other driving force transmission path is disconnected from the first or second input shaft, and when a gear position is shifted from said speed gear position to a new speed gear position, the selection device for the other transmission path is operated and the one of the two gear trains for the other driving force transmission path is disconnected from the first or second input shaft while the other of the two gear trains for the other driving force transmission path is connected to the first or second input shaft via the first or second clutch, wherein the transmission comprises a driving force regulation device that suppresses variation of the driving force transmitted to the driven wheel by changing the driving force of the drive source at a time of pre-shifting when the selection device for one of the first and second driving force transmission path that is not transmitting the driving force is operated and changes connection of the input shaft of the other driving force transmission path from the one of the two gear trains to the other of the two gear trains, thereby suppressing variation in the driving force to be transmitted from the other of the two gear trains for the other driving force transmission path to the output shaft.

2. The dual clutch transmission according to claim 1, wherein the driving force regulation means reduces the torque of the drive source when the first selection means or the second selection means carries out a pre-shift to a higher speed gear position than the current gear position, and increases the torque of the drive source when the first selection means or the second selection means carries out a pre-shift to a lower speed gear position than the current gear position.

3. The dual clutch transmission according to claim 2, wherein the drive source is an internal combustion engine, and reduction of the torque is carried out by retardation of the ignition timing of the internal combustion engine or decrease of the amount of fuel injected into the internal combustion engine.

4. The dual clutch transmission according to claim 2, wherein the drive source is an internal combustion engine, and increase of the torque is carried out by increase of the intake air amount and retardation of the ignition timing of the internal combustion engine in combination or by increase of the amount of fuel injected into the internal combustion engine.

5. The dual clutch transmission according to claim 2, wherein the drive source is an electric motor, and reduction of the torque is carried out by decrease of the drive current for the electric motor.

6. The dual clutch transmission according to claim 2, wherein the drive source is an electric motor, and increase of the torque is carried out by increase of the drive current for the electric motor.

* * * * *